(12) United States Patent
Lyu

(10) Patent No.: US 7,623,207 B2
(45) Date of Patent: Nov. 24, 2009

(54) LIQUID CRYSTAL DISPLAY APPARATUS AND METHOD OF MANUFACTURING THE SAME COMPRISING INTERNAL BIAXIAL CHOLESTERIC RETARDATION LAYER

(75) Inventor: Jae-Jin Lyu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/725,595

(22) Filed: Dec. 3, 2003

(65) Prior Publication Data
US 2005/0036089 A1 Feb. 17, 2005

(30) Foreign Application Priority Data
Aug. 12, 2003 (KR) ............... 10-2003-0055738

(51) Int. Cl.
*G02F 1/1335* (2006.01)
(52) U.S. Cl. ............... 349/117; 349/118
(58) Field of Classification Search ............... None
See application file for complete search history.

(56) References Cited
U.S. PATENT DOCUMENTS

| | | | | |
|---|---|---|---|---|
| 5,011,268 A | * | 4/1991 | Kaganowicz | 349/125 |
| 5,638,197 A | * | 6/1997 | Gunning et al. | 349/96 |
| 5,953,091 A | * | 9/1999 | Jones et al. | 349/129 |
| 6,124,907 A | * | 9/2000 | Jones et al. | 349/96 |
| 6,169,590 B1 | * | 1/2001 | Abileah et al. | 349/120 |
| 2002/0140888 A1 | * | 10/2002 | Nishiyama et al. | 349/117 |

* cited by examiner

*Primary Examiner*—David Nelms
*Assistant Examiner*—W. Patty Chen
(74) *Attorney, Agent, or Firm*—Cantor Colburn LLP

(57) ABSTRACT

A liquid crystal display apparatus includes a lower substrate, an upper substrate, a liquid crystal layer and a retardation layer. The lower substrate includes a first transparent substrate. The upper substrate faces the first transparent substrate. The upper substrate includes a second transparent substrate. The liquid crystal layer is interposed between the lower substrate and the upper substrate. The retardation layer is interposed between the first and second transparent substrates. The retardation layer compensates phase difference of light that passes through the liquid crystal layer. The retardation layer takes the place of the retardation film of a general liquid crystal display apparatus, so that the retardation film is not necessary to reduce manufacturing cost.

6 Claims, 26 Drawing Sheets

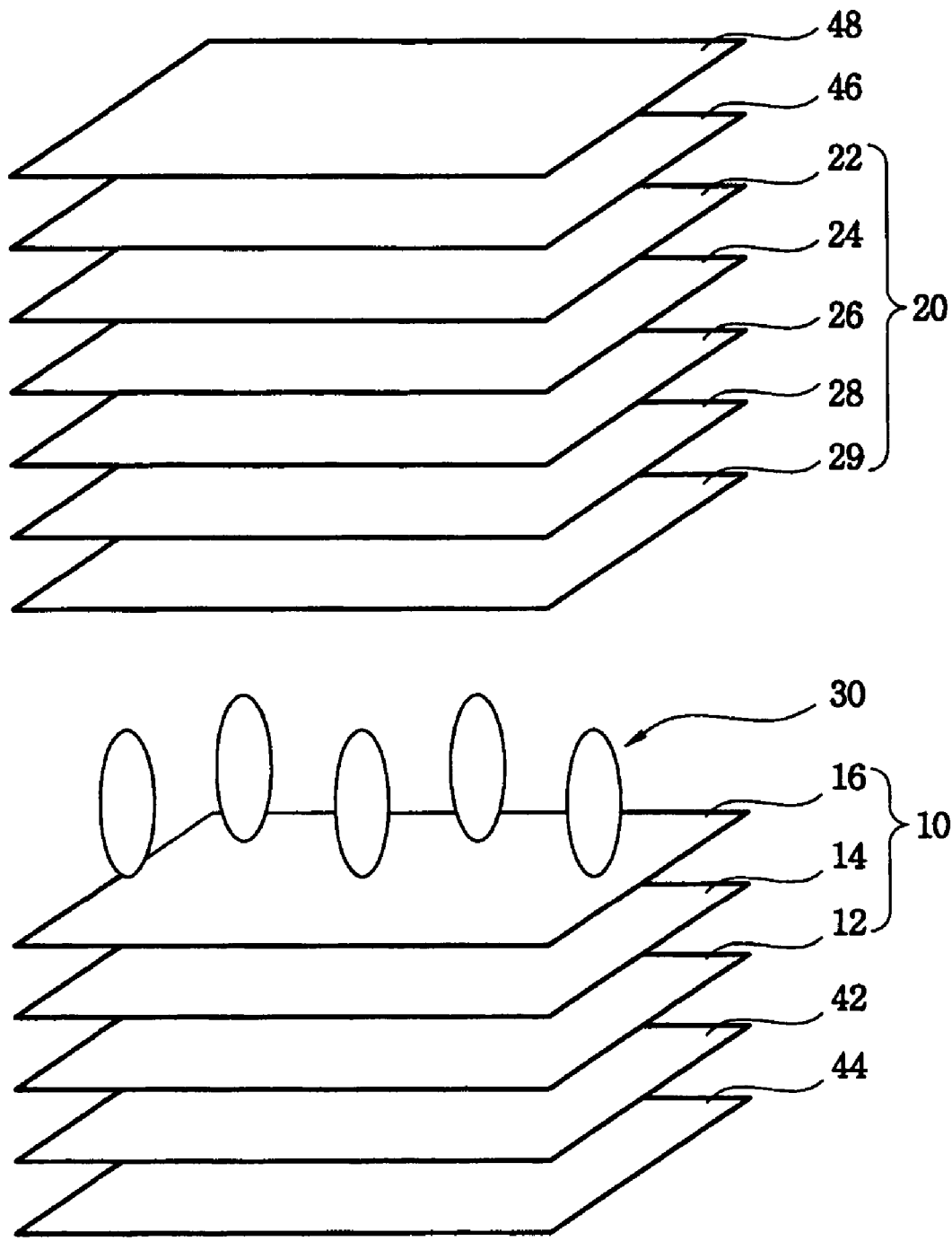

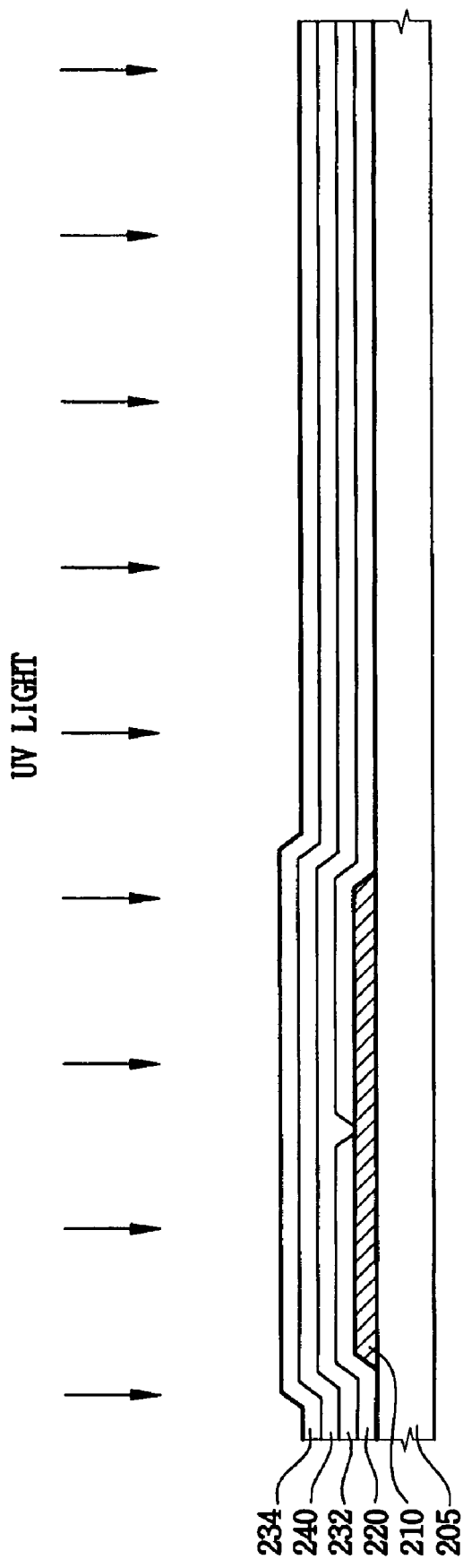

LIQUID CRYSTAL DISPLAY APPARATUS AND METHOD OF MANUFACTURING THE SAME COMPRISING INTERNAL BIAXIAL CHOLESTERIC RETARDATION LAYER

CROSS-REFERENCE TO RELATED APPLICATIONS

This application relies for priority upon Korean Patent Application No. 2003-55738 filed on Aug. 12, 2003, the contents of which are herein incorporated by reference in its entirety.

BACKGROUND OF THE INVENTION

1. Field of the Invention

The present invention relates to a liquid crystal display apparatus and a method of manufacturing a substrate of the liquid crystal display apparatus, and more particularly to a liquid crystal display apparatus with retardation layer formed in a liquid crystal display panel and a manufacturing a substrate of the liquid crystal display apparatus.

2. Description of the Related Art

A general retardation film is used for a liquid crystal display apparatus. The retardation film allows a linearly polarized light to pass through the retardation film. The linearly polarized light is refracted in two directions due to a difference of velocity.

A first linearly polarized light that is referred to as 'ordinary light' is refracted according to Snell's law. However, a second polarized light that is referred to as 'extraordinary light' is refracted against the Snell's law. The retardation film applies different phases to the ordinary light and the extraordinary light.

Particularly, the retardation film of which optic axis is tilted with respect to a surface or normal line of the retardation film, compensates light that passes through the liquid crystal display apparatus. Thus, the retardation film increases viewing angle of the liquid crystal display apparatus.

FIG. 1 is a schematic view showing a general liquid crystal display apparatus.

Referring to FIG. 1, a general liquid crystal display apparatus includes an array substrate 10, a color filter substrate 20, a liquid crystal layer 30, a first retardation film 42, a first polarizing plate (or polarizer) 44, a second retardation film 46 and a second polarizing plate (or analyzer) 48. The array substrate 10 includes a first transparent substrate 12, a pixel electrode 14 and a first alignment film 16. The pixel electrode 14 is formed on the first transparent substrate 12. The first alignment film 16 is formed on the pixel electrode 14.

The color filter substrate 20 includes a second transparent substrate 22, a color filter layer 24, protection layer 26, a common electrode layer 28 and a second alignment film 29. The color filter layer 24 is formed on the second transparent substrate 22. The protection layer 26 is formed on the color filter layer 24. The common electrode layer 28 is formed on the protection layer 26. The second alignment film 29 is formed on the common electrode layer 28. The liquid crystal layer is interposed between the array substrate 10 and the color filter substrate 20. The first retardation film 42 is disposed on a backside of the first transparent substrate 12. The first polarizing plate 44 is disposed on the first retardation film 42. The second retardation film 46 is disposed on a backside of the second transparent substrate 46. The second polarizing plate 48 is disposed on the second retardation film 46.

When electric fields are formed between the pixel electrode 14 and the common electrode layer 28, liquid crystal molecules of the liquid crystal layer 30 are erected (Homogeneous phase) or laid (Homeotropic phase) with respect to the array substrate 10 and the color filter substrate 20.

FIG. 2A is a plan view showing vertical angles formed between a first polarizing axis of a first polarizing plate and a second polarizing axis of a second polarizing plate, and FIG. 2B is a perspective view showing vertical angles formed between a first polarizing axis of a first polarizing plate and a second polarizing axis of a second polarizing plate.

Referring to FIG. 2A, when the liquid crystal molecules are erected (or vertically aligned), a light is not leaked in a normal direction of the liquid crystal display apparatus because a polarizing axis of the first and second polarizing plates are substantially orthogonal to each other.

Referring to FIG. 2B, the light is leaked in a tilted direction because the polarizing axis of the first and second polarizing plate are not orthogonal to each other. Thus, a contrast ratio decreases, so that a display quality is deteriorated.

In order to reduce the leakage of the light, a retardation film such as a biaxial film and uni-axial film is disposed at backsides of the first and second transparent substrates 12 and 22 together with the first and second polarizing plates 44 and 48.

The retardation film increases a cost of manufacturing the liquid crystal display apparatus.

SUMMARY OF THE INVENTION

Accordingly, the present invention is provided to substantially obviate one or more problems due to limitations and disadvantages of the related art.

It is a feature of the present invention to provide a liquid crystal display apparatus with retardation layer interposed between substrates of a liquid crystal display panel.

It is another feature of the present invention to provide a method of manufacturing a color filter substrate for the liquid crystal display apparatus.

It is still another feature of the present invention to provide a method of manufacturing an array substrate for the liquid crystal display apparatus.

In one aspect of the liquid crystal display apparatus, the liquid crystal display apparatus includes a lower substrate, an upper substrate, a liquid crystal layer and a retardation layer. The lower substrate includes a first transparent substrate. The upper substrate faces the first transparent substrate. The upper substrate includes a second transparent substrate. The liquid crystal layer is interposed between the lower substrate and the upper substrate. The retardation layer is interposed between the first and second transparent substrates. The retardation layer compensates phase difference of light that passes through the liquid crystal layer.

According to the method of manufacturing a color filter substrate, a color filter layer is formed on a transparent substrate. A liquid crystal material is coated on the color filter layer. An ultraviolet light is irradiated onto the liquid crystal material to form a retardation layer with a fixed alignment of liquid crystal molecules of the liquid crystal material, the retardation layer. A common electrode layer is formed on the retardation layer. Then, an alignment film is formed on the common electrode layer.

According to another method of manufacturing a color filter substrate, a color filter layer is formed on a transparent substrate. A protection layer is formed on the color filter layer. A liquid crystal material is coated on the protection layer. An ultraviolet light is irradiated onto the liquid crystal material to form a retardation layer with a fixed alignment of liquid crystal molecules of the liquid crystal material, the retardation layer. A common electrode layer is formed on the retardation layer. Then, an alignment film is formed on the common electrode layer.

According to another method of manufacturing a color filter substrate, a color filter layer is formed on a transparent substrate. A protection layer is formed on the color filter layer. A common electrode layer is formed on the protection layer. A liquid crystal material is coated on the common electrode layer. An ultraviolet light is irradiated onto the liquid crystal material to form a retardation layer with a fixed alignment of liquid crystal molecules of the liquid crystal material, the retardation layer. Then, an alignment film is formed on the retardation layer.

According to the liquid crystal display apparatus and the method of this invention, the retardation layer takes the place of the retardation film of a general liquid crystal display apparatus, which disposed over the color filter substrate or under the array substrate, so that the retardation film is not necessary.

Therefore, a number of films for the liquid crystal display apparatus and a number of processes are reduced to save a manufacturing cost.

BRIEF DESCRIPTION OF THE DRAWINGS

The above and other features and advantage points of the present invention will become more apparent by describing in detailed exemplary embodiments thereof with reference to the accompanying drawings, in which:

FIG. 1 is a schematic view showing a general liquid crystal display apparatus;

FIGS. 9A through 9E are cross-sectional views showing a process of manufacturing a color filter substrate of FIG. 8;

DESCRIPTION OF THE PREFERRED EMBODIMENTS

Hereinafter, the preferred embodiments of the present invention will be described in detail with reference to the accompanying drawings.

Embodiment 1

Figure 2A:
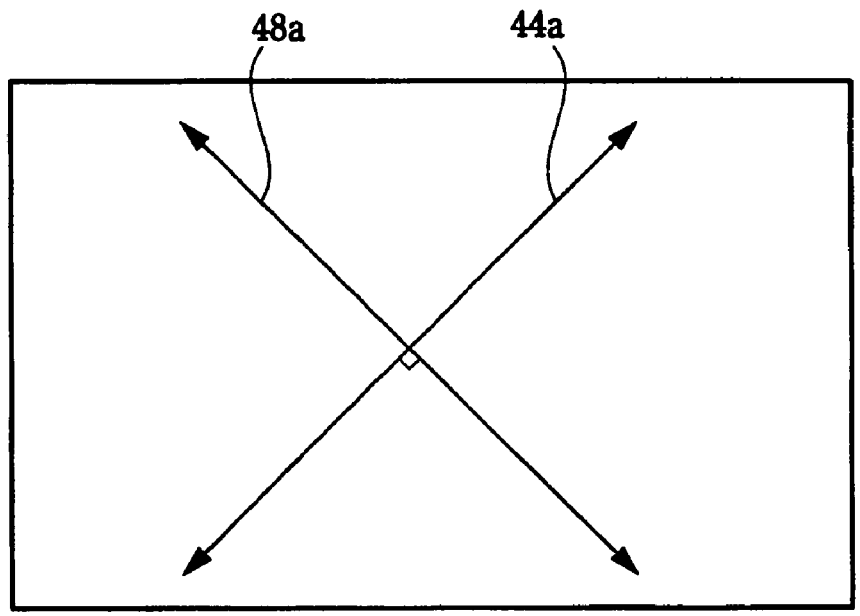
FIG. 2A is a plan view showing vertical angles formed between a first polarizing axis of a first polarizing plate and a second polarizing axis of a second polarizing plate.
Figure 2B:
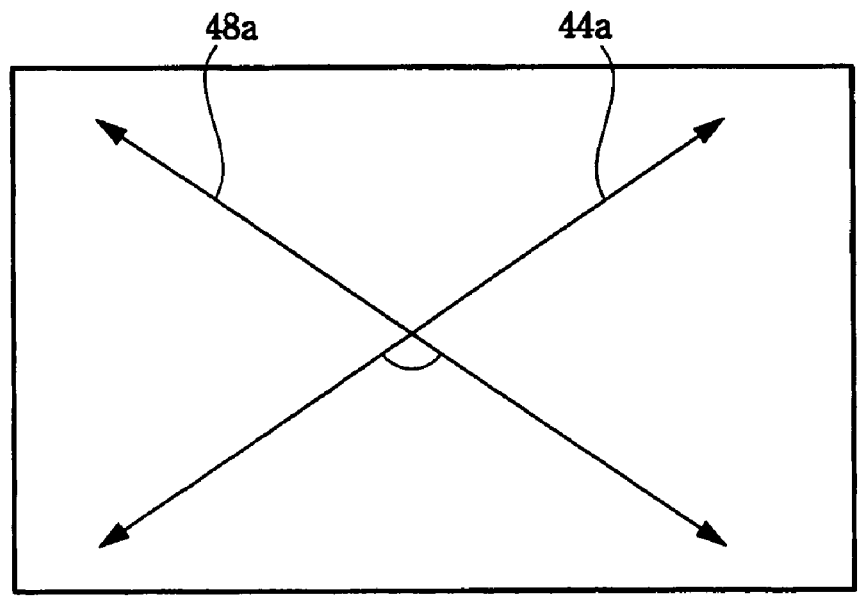
FIG. 2B is a perspective view showing vertical angles formed between a first polarizing axis of a first polarizing plate and a second polarizing axis of a second polarizing plate.
Figure 3:
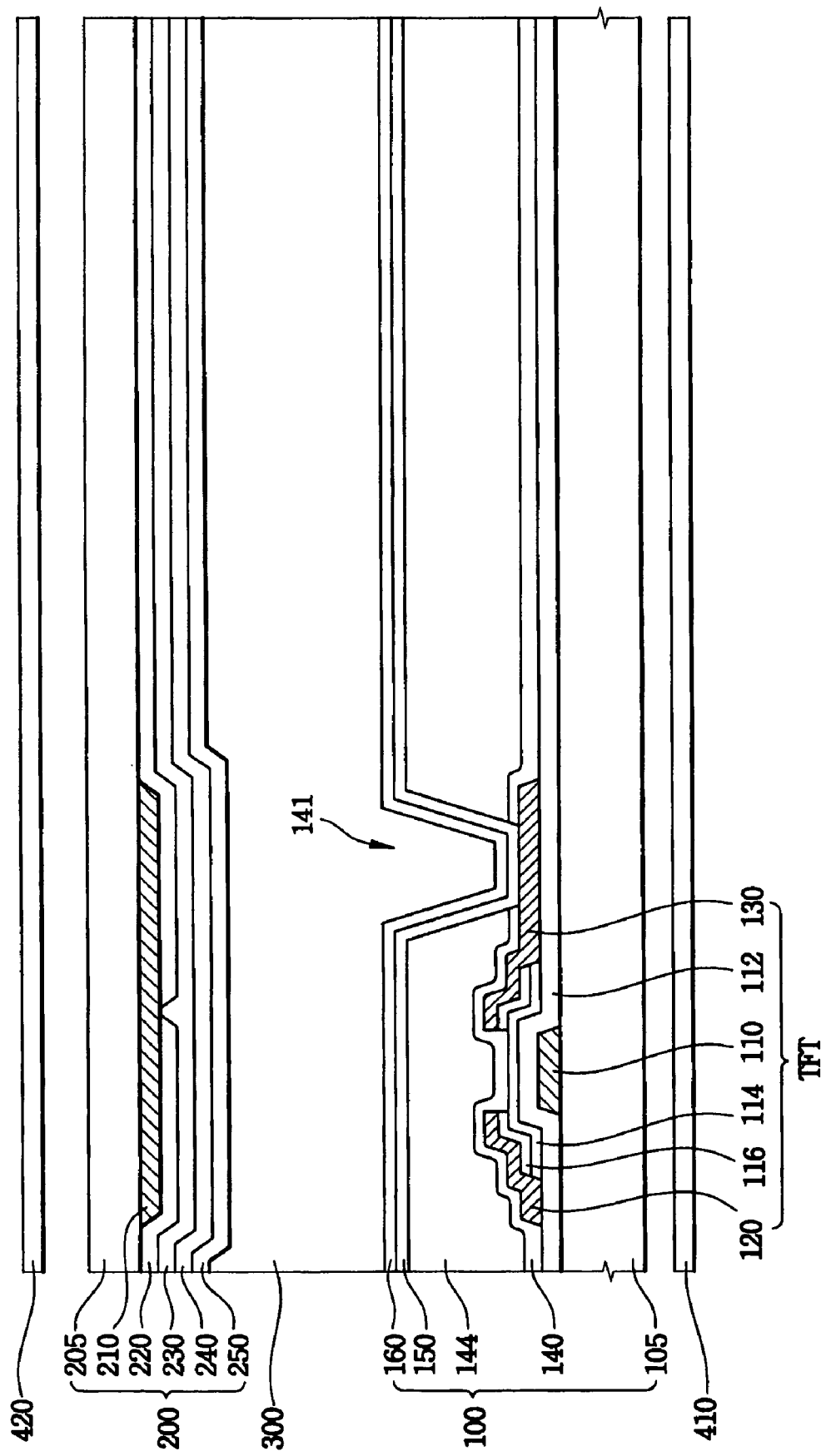
FIG. 3 is a cross-sectional view showing a liquid crystal display apparatus according to a first exemplary embodiment.

FIG. 3 is a cross-sectional view showing a liquid crystal display apparatus according to a first exemplary embodiment. In the present embodiment, a retardation layer is formed on a protection layer.

Referring to FIG. 3, a liquid crystal display apparatus according to a first exemplary embodiment includes an array substrate 100, a color filter substrate 200, a liquid crystal layer 300, and first and second polarizing plates 410 and 420. The liquid crystal layer 300 is interposed between the array substrate 100 and the color filter substrate 200. The first polarizing plate 410 is disposed under a backside of the array substrate 100. The second polarizing plate 420 is disposed over a backside of the color filter substrate 200.

The array substrate 100 includes a first transparent substrate 105, a gate insulation layer 112, a switching device TFT, a passivation layer 140, an organic insulation layer 144, a pixel electrode 150 and a first alignment film 160.

The switching device TFT includes a gate electrode 110, a gate insulation layer 112, a semiconductor layer 114, an ohmic contact layer 116, a source electrode 120 and a drain electrode 130.

The gate insulation layer 112 is formed on the first transparent substrate 105, such that the gate insulation layer 112 covers the gate electrode 110 of the switching device TFT.

The passivation layer 140 covers the switching device TFT, such that a portion of the drain electrode 130 of the switching device TFT is exposed.

The organic insulation layer 144 is formed on the passivation layer 140, such that the portion of the drain electrode 130 of the switching device TFT is exposed.

The pixel electrode 150 is formed on the organic insulation layer 144, such that the pixel electrode makes contact with the drain electrode 130 of the switching device TFT via a contact hole 141. The pixel electrode 150 comprises indium tin oxide (ITO) or indium zinc oxide (IZO), so that pixel electrode 150 is transparent and electrically conductive.

The first alignment film 160 is formed on the pixel electrode 150.

Not shown in FIG. 3, when the liquid crystal display apparatus corresponds to independent wiring type, a wiring for capacitance is separately formed, such that the wiring is spaced apart from the switching device TFT. The wiring and the pixel electrode 150 define a storage capacitor Cst. The liquid crystal display apparatus may correspond to a previous gate type.

The color filter substrate 200 includes a second transparent substrate 205, a black matrix 210, a color filter layer 220, a retardation layer 230, a common electrode layer 240 and a second alignment film 250.

The black matrix 210 is formed on the second transparent substrate 205, such that the black matrix 210 faces the switching device. Thus, the black matrix 250 hides the switching device.

The color filter layer 220 includes a red pixel region, a green pixel region and a blue pixel region. The black matrix 210 divides the red pixel region, the green pixel region and the blue pixel region. An edge of the red pixel region, the green pixel region and the blue pixel region may overlap with each other, so that the edge may hide the switching device TFT as a substitute of the black matrix 210.

The retardation layer 230 is formed on the black matrix 210 and the color filter layer 220. The retardation layer 230 protects the black matrix 210 and the color filter layer 220. The retardation layer 230 compensates a phase difference of a light that passes through the liquid crystal layer 300. The light may be generated from a backlight assembly (not shown) in a transmissive type liquid crystal display apparatus. The light may correspond to a natural light that enters into the liquid crystal display apparatus via the backside of the color filter substrate 200 in a reflective type liquid crystal display apparatus. The light may be generated from the backlight assembly or correspond to the natural light in a transmissive and reflective type liquid crystal display apparatus.

The retardation layer 230 may comprise a liquid crystal polymer that is hardened when an ultraviolet light is irradiated. For example, the retardation layer 230 comprises cholesteric liquid crystal.

Figure 4:
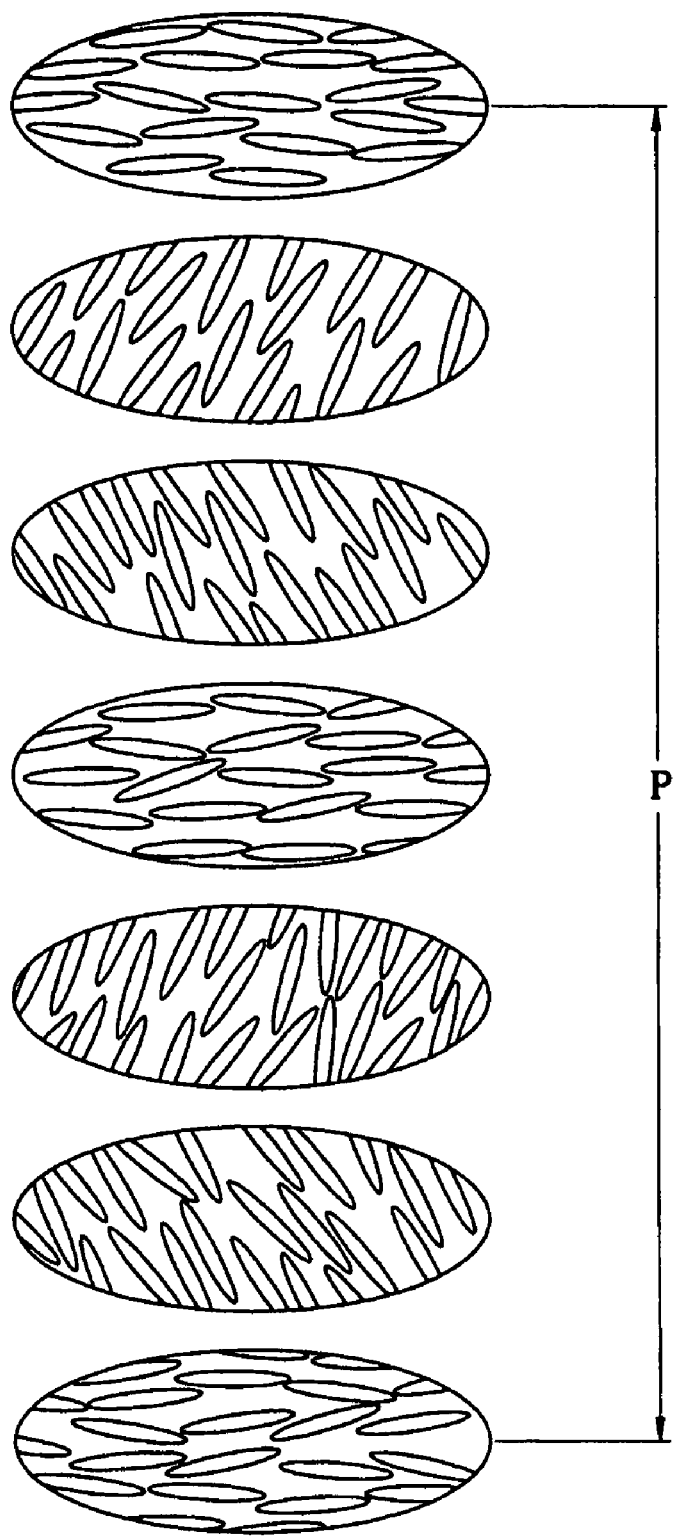
FIG. 4 is a schematic view showing an arrangement of cholesteric liquid crystal molecules.

FIG. 4 is a schematic view showing an arrangement of cholesteric liquid crystal molecules.

Referring to FIG. 4, a director 'n' of cholesteric liquid crystal (or chiral nematic liquid crystal) molecules rotates gradually in a z-axis direction to form a spiral shape. That is, the director n is expressed in an expression, n=(cos $2\pi/p$, sin $2\pi/p$, 0). A period of rotation 'p' is characterized by the cholesteric liquid crystal. An axis of the spiral shape corresponds to an optic axis. In a microscopic view, the cholesteric liquid crystal molecules are arranged, such that each of the cholesteric liquid crystal molecules has the same director likewise the twisted nematic liquid crystal molecules.

However, in a macroscopic view, the directors of the cholesteric liquid crystal molecules are arranged in a circular shape.

Referring again to FIG. 3, the cholesteric liquid crystal material is coated on the retardation layer 220. Then, an ultraviolet light is irradiated onto the cholesteric liquid crystal material to harden the cholesteric liquid crystal material. Thus, directors of the liquid crystal molecules are fixed, so that the retardation layer 230 performing a function of a biaxial film or uni-axial film is formed.

In detail, when a polarized ultraviolet light is irradiated onto a film including the cholesteric liquid crystal material, the biaxial film is formed. When a non-polarized ultraviolet light is irradiated onto a film including the cholesteric liquid crystal material, a C-plate film is formed.

In case of the biaxial film, a refractivity of x-direction $n_x$, a refractivity of y-direction $n_y$, and a refractivity of z-direction $n_z$ are different from each other.

The uni-axial film is divided into an A-plate film and C-plate film. In case of the A-plate film, the refractivity of y-direction $n_y$ is substantially equal to the refractivity of z-direction $n_z$. The refractivity of y-direction $n_y$ and the refractivity of z-direction $n_z$ are less than the refractivity of x-direction $n_x$ ($n_x > n_y = n_z$).

In case of the C-plate film, the refractivity of x-direction $n_x$ is substantially equal to the refractivity of y-direction $n_y$. The refractivity of x-direction $n_x$ and the refractivity of y-direction $n_y$ are greater than the refractivity of z-direction $n_z$ ($n_x = n_y > n_z$).

The retardation layer 230 may be formed via a spin coating method, a micro gravure coating method or a capillary coating method. In the spin coating method, an amount of material that is disused is larger than an amount of material that is used for coating. Thus, the retardation layer 230 is preferably formed via the micro gravure coating method disclosed in U.S. Pat. No. 4,791,881 or the capillary coating method.

The retardation layer 230 may include reactive mesogen mixture (RMM), polyvinylalchol (PVA), polycarbonate (PC), or cycloolefin polymer (COP).

The common electrode layer 240 is formed on the retardation layer 230. A reference voltage $V_{com}$ is applied to the common electrode layer 240. Thus, electric fields are formed between the common electrode layer 240 and the pixel electrode 150 where a pixel voltage is applied.

The second alignment layer 250 is formed on the common electrode layer 240. The second alignment layer 250 aligns the liquid crystal molecules. When the common electrode layer 240 may not be formed, the second alignment layer 250 may be formed on the retardation layer 230.

The liquid crystal layer 300 is interposed between the array substrate 100 and the color filter substrate 240. When the pixel voltage is applied to the pixel electrode 150, the electric fields are formed between the array substrate 100 and the color filter substrate 200. Thus, liquid crystal molecules are rearranged according to the electric fields. The liquid crystal layer 300 may correspond to a twisted nematic (TN) mode, a vertical alignment (VA) mode or optically compensated birefringence (OCB) mode.

The first polarizing plate (or polarizer) 410 is disposed under the array substrate 100, so that a polarized light enters the array substrate 100 via the first polarizing plate 410.

The second polarizing plate (or analyzer) 420 is disposed over the color filter substrate 200, so that the polarized light is analyzed via the second polarizing plate 420.

FIGS. 5A through 5D are cross-sectional views showing a process of manufacturing a color filter substrate of FIG. 3.

Figure 5A:
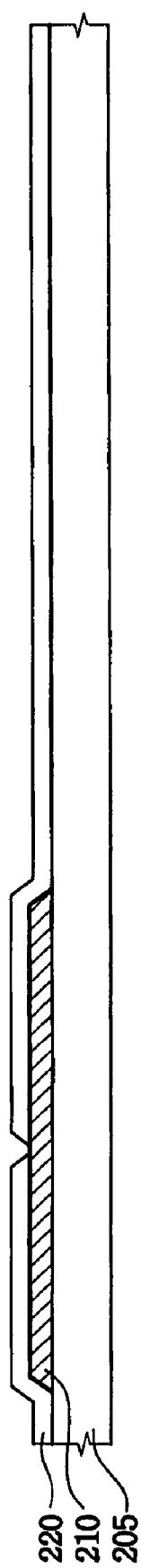
FIGS. 5A through 5D are cross-sectional views showing a process of manufacturing a color filter substrate of FIG. 3.

Referring to FIG. 5A, a metal layer including chromium (Cr) is deposited on a second transparent substrate 205. A photoresist is deposited on the metal layer. Then, the photoresist is exposed and developed selectively via a photomask (not shown). Thus, a black matrix 210 including the chromium (Cr) is formed. The black matrix 210 is disposed such that the black matrix 210 faces a switching device of an array substrate when a color filter substrate and an array substrate are assembled together.

Then, a photosensitive red-colored resist is deposited on the second transparent substrate 205. Then, the red-colored resist is exposed and developed, so that red color filter is formed. Green color filter and blue color filter are formed via same process. Thus, color filter layer 220 is formed.

Figure 5B:
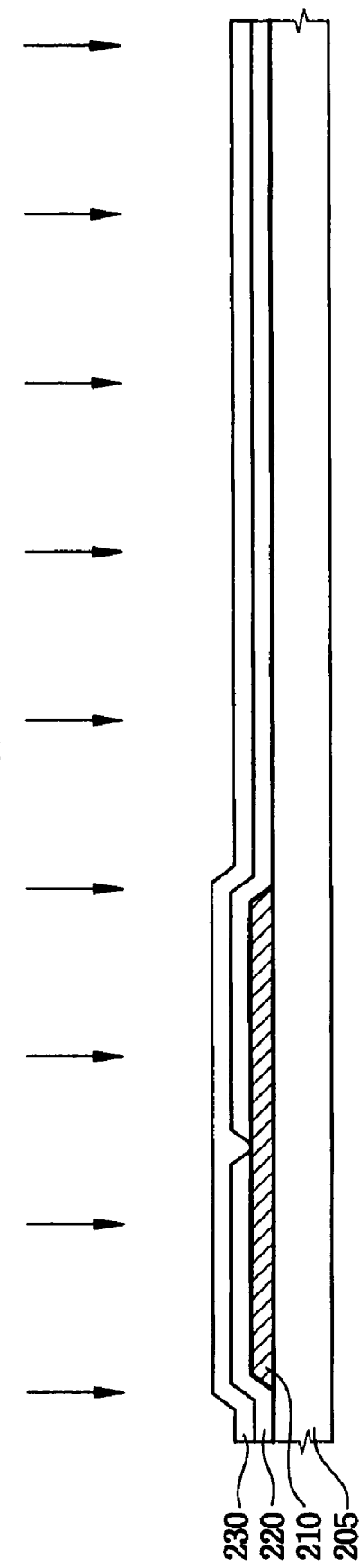

Referring to FIG. 5B, a liquid crystal polymer such as cholesteric liquid crystal material is coated on the color filter layer 220. The liquid crystal molecules of the cholesteric liquid crystal material are aligned. Then, an ultraviolet light is irradiated onto the cholesteric liquid crystal material to fix the alignment of the liquid crystal molecules. Thus, a retardation layer 230 is formed. When the ultraviolet light is polarized, the retardation layer 230 corresponds to a biaxial film. However, when the ultraviolet light is not polarized, the retardation layer 230 corresponds to a C-plate film.

Figure 5C:
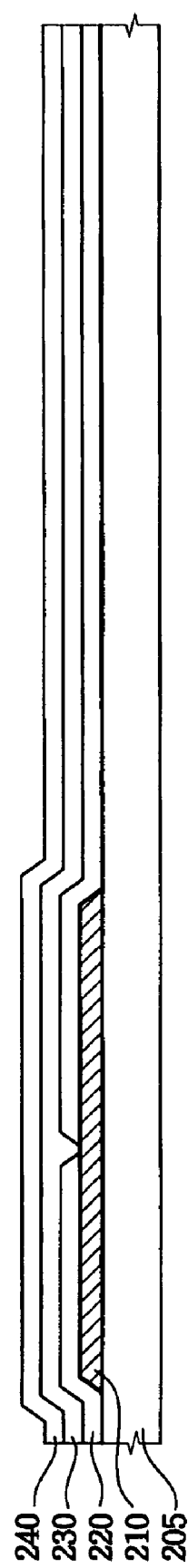

Referring to FIG. 5C, a common electrode layer 240 is formed on a retardation layer 230. The common electrode layer 240 comprises a transparent and electrically conductive material such as indium tin oxide (ITO) and indium zinc oxide (IZO).

Figure 5D:
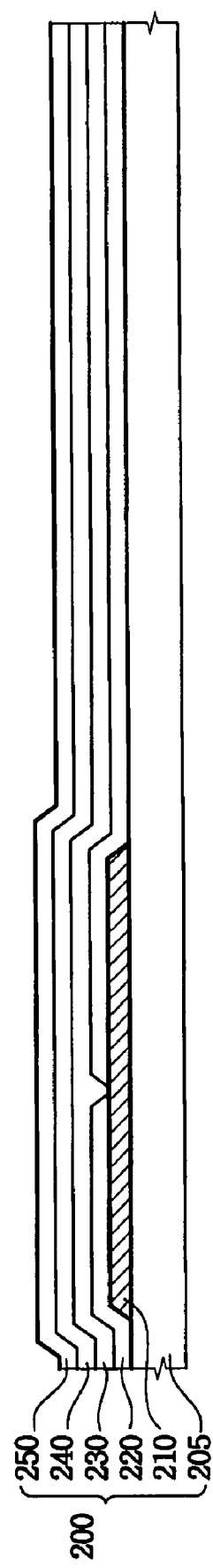

Referring to FIG. 5D, an alignment film 250 is formed on the common electrode layer 240. The alignment film 250 allows liquid crystal molecules to arrange toward a predetermined direction. The alignment film 250 may include an inorganic material or an organic material as long as the alignment film 250 forms a pre-tilt angle of liquid crystal molecule.

The inorganic material for the alignment film 250 may comprise silicon oxide ($SiO_2$), a metal oxide such as magnesium oxide (MgO), magnesium fluoride ($MgF_2$), gold (Au), etc. When the inorganic material is used for the alignment film 250, an inorganic material is deposited in a predetermined direction. Thus, a separate aligning process is not necessary.

The organic material for the alignment film 250 may comprise a resin such as, polyimide and polyvinyl alcohol, a silane compound that may be absorbed on a substrate, and polyamic acid that may be formed in a thin film. When the organic material is used for the alignment film 250, the separate aligning process is necessary.

That is, the organic material may be rubbed, or a polarized ultraviolet light may be irradiated.

Further, the alignment film 250 may be formed in a single layered structure comprising one material, or a multi-layered structure comprising at least two materials. For example, an inorganic layer is formed at first. Then, an organic layer is formed on the inorganic layer. When the aligning film 250 is formed in the multi-layered structure, a vertical aligner such as lecithin may be added to the organic material.

The color filter substrate 200 of FIG. 3 is formed via a process described in FIGS. 5A-5D. When the color filter substrate 200 is completed, the color filter substrate 200 is assembled with the array substrate 100. Then, liquid crystal material is interposed between the array substrate 100 and the color filter substrate 200 to form the liquid crystal layer 300. The liquid crystal layer 300 may be formed before the array substrate 100 and the color filter substrate are assembled with each other.

As described above, the retardation layer formed on the color filter layer protects the color filter layer. Further, the ultraviolet light is irradiated onto the retardation layer comprising a cholesteric liquid crystal, so that the retardation layer compensates a phase difference. Thus, the retardation layer takes the place of the retardation film of a general liquid crystal display apparatus, which is disposed over the color filter substrate or under the array substrate, so that the retardation film is not necessary.

Therefore, a number of films for the liquid crystal display apparatus and a number of processes are reduced to save a manufacturing cost.

Embodiment 2

Figure 6:
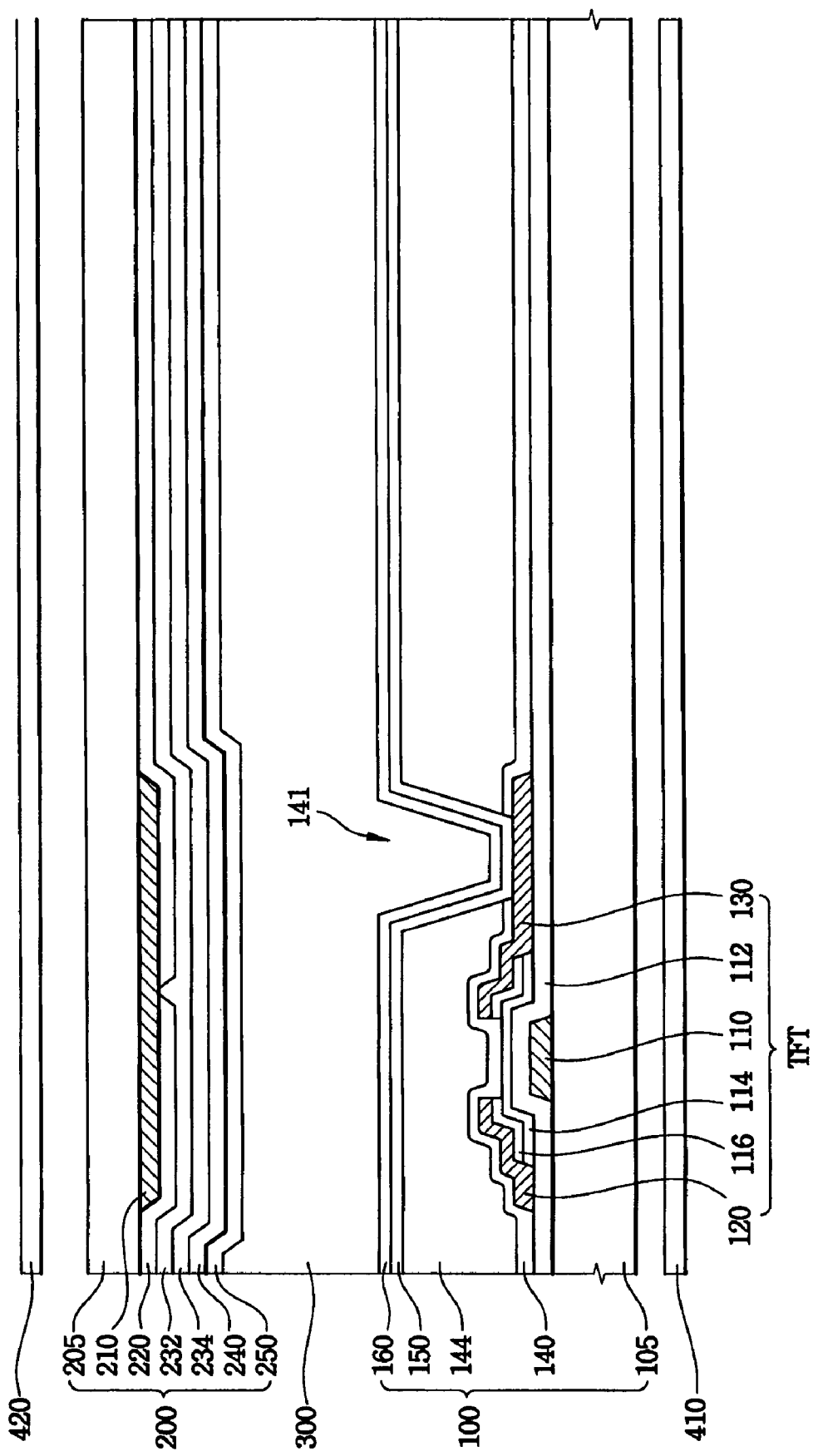
FIG. 6 is a cross-sectional view showing a liquid crystal display apparatus according to a second exemplary embodiment of the present invention.

FIG. 6 is a cross-sectional view showing a liquid crystal display apparatus according to a second exemplary embodiment of the present invention. The liquid crystal display apparatus is same as in Embodiment 1 except for a protection layer. Thus, the same reference numerals will be used to refer to the same or like parts as those described in Embodiment 1 and any further explanation will be omitted.

Referring to FIG. 6, a liquid crystal display apparatus according to a second exemplary embodiment includes an array substrate 100, a color filter substrate 200, a liquid crystal layer 300, and first and second polarizing plates 410 and 420. The liquid crystal layer 300 is interposed between the array substrate 100 and the color filter substrate 200. The first polarizing plate 410 is disposed under a backside of the array substrate 100. The second polarizing plate 420 is disposed over a backside of the color filter substrate 200.

The color filter substrate 200 includes a second transparent substrate 205, a black matrix 210, a color filter layer 220, a protection layer 232, a retardation layer 234, a common electrode layer 240 and a second alignment film 250.

The black matrix 210 is formed on the second transparent substrate 205, such that the black matrix 210 faces the switching device. Thus, the black matrix 210 hides the switching device.

The color filter layer 220 includes a red pixel region, a green pixel region and a blue pixel region. The black matrix 210 defines the red pixel region, the green pixel region and the blue pixel region. An edge of the red pixel region, the green pixel region and the blue pixel region may overlap with each other, so that the edge may hide the switching device TFT as a substitute of the black matrix 210.

The protection layer 232 is formed on the black matrix 210 and the color filter layer 220. The protection layer 232 protects the black matrix 210 and the color filter layer 220.

The retardation layer 234 is formed on the protection layer 232. The retardation layer 234 compensates a phase difference of a light that passes through the liquid crystal layer 300.

The retardation layer 234 may comprise a liquid crystal polymer that is hardened when an ultraviolet light is irradiated. For example, the retardation layer 230 comprises cholesteric liquid crystal.

FIGS. 7A through 7E are cross-sectional views showing a process of manufacturing a color filter substrate of FIG. 6.

Figure 7A:
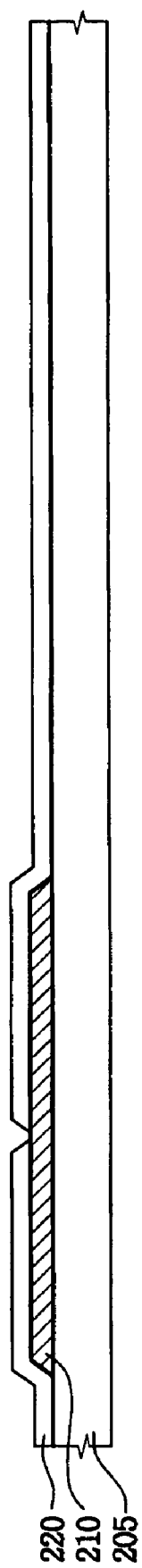
FIGS. 7A through 7E are cross-sectional views showing a process of manufacturing a color filter substrate of FIG. 6.

Referring to FIG. 7A, a metal layer including chromium (Cr) is deposited on a second transparent substrate 205. A photoresist is deposited on the metal layer. Then, the photoresist is exposed and developed selectively via a photomask (not shown). Thus, a black matrix 210 including the chromium (Cr) is formed. The black matrix 210 is disposed such that the black matrix 210 faces a switching device of an array substrate when a color filter substrate and an array substrate are assembled together.

Then, a photosensitive red-colored resist is deposited on the second transparent substrate 205. Then, the red-colored resist is exposed and developed, so that red color filter is formed. Green color filter and blue color filter are formed via same process. Thus, color filter layer 220 is formed.

Figure 7B:
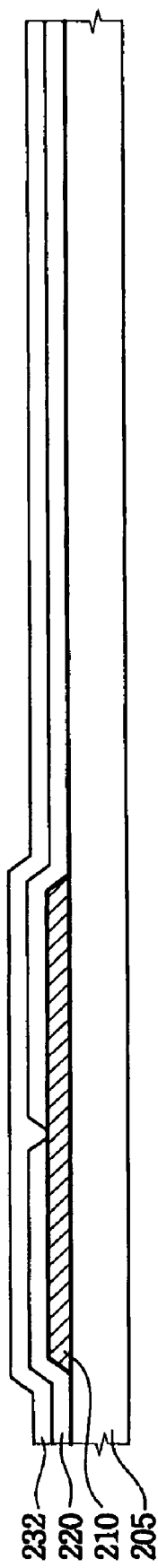

Referring to FIG. 7B, a protection layer 232 is formed on the color filter layer 220 to protect the color filter layer 220.

Figure 7C:
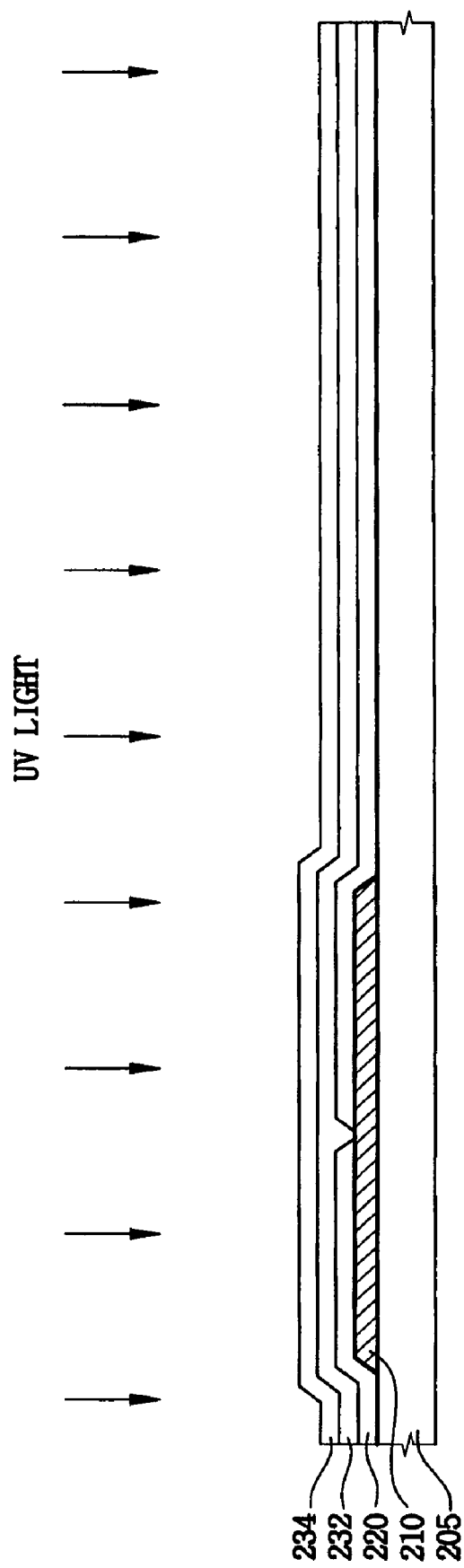

Referring to FIG. 7C, a liquid crystal polymer such as cholesteric liquid crystal material is coated on the protection layer 232. The liquid crystal molecules of the cholesteric liquid crystal material are aligned. Then, an ultraviolet light is irradiated onto the cholesteric liquid crystal material to fix the alignment of the liquid crystal molecules. Thus, a retardation layer 234 is formed. When the ultraviolet light is polarized, the retardation layer 234 corresponds to a biaxial film. However, when the ultraviolet light is not polarized, the retardation layer 234 corresponds to a C-plate film.

The retardation layer 234 may be formed via a spin coating method, a micro gravure coating method or a capillary coating method. Preferably, the retardation layer 234 is formed via the micro gravure coating method or the capillary coating method.

The retardation layer 234 may include reactive mesogen mixture (RMM), polyvinylalchol (PVA), polycarbonate (PC), or cycloolefin polymer (COP).

Figure 7D:
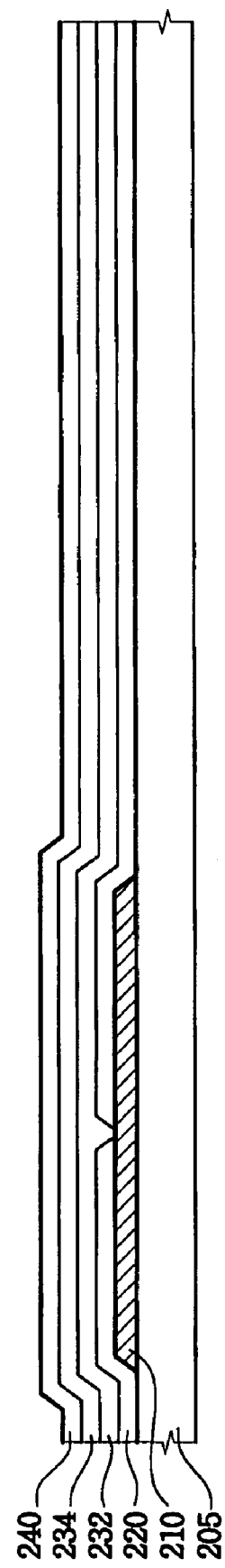
Figure 7E:
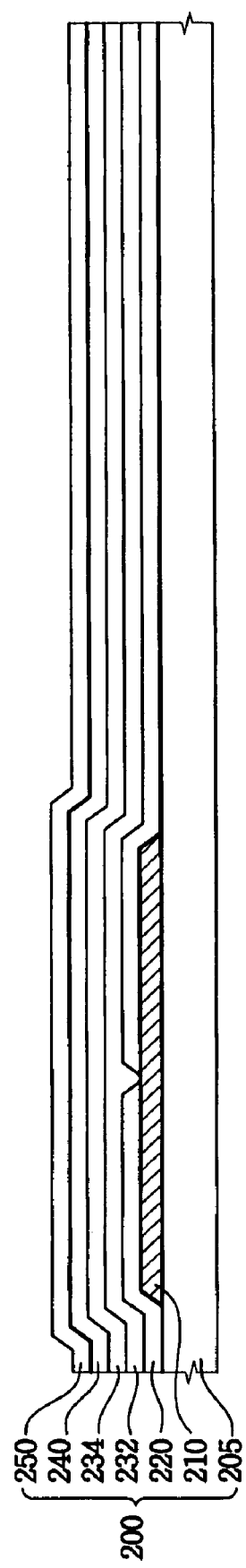

Referring to FIGS. 7D and 7E, a common electrode layer 240 is formed on a retardation layer 234. The common electrode layer 240 comprises a transparent and electrically conductive material such as indium tin oxide (ITO) and indium zinc oxide (IZO). Then, an alignment film 250 is formed on the common electrode layer 240. The alignment film 250 allows liquid crystal molecules to arrange toward a predetermined direction. The alignment film 250 may include an inorganic material or an organic material as long as the alignment film 250 forms a pre-tilt angle of liquid crystal molecule. In FIG. 7E, the alignment film 250 is formed on the common electrode layer 240. However, when the common electrode layer 240 is not formed, the alignment film 250 may be formed on the retardation layer 240.

The color filter substrate 200 of FIG. 6 is formed via a process described in FIGS. 7A through 7E. When the color filter substrate 200 is completed, the color filter substrate 200 is assembled with the array substrate 100. Then, liquid crystal material is interposed between the array substrate 100 and the color filter substrate 200 to form the liquid crystal layer 300. The liquid crystal layer 300 may be formed before the array substrate 100 and the color filter substrate are assembled with each other.

As described above, the ultraviolet light is irradiated onto the retardation layer comprising a cholesteric liquid crystal, so that the retardation layer compensates a phase difference. Thus, the retardation layer interposed between the protection layer and the common electrode takes the place of the retardation film of a general liquid crystal display apparatus, which is disposed over the color filter substrate or under the array substrate, so that the retardation film is not necessary.

Therefore, a number of films for the liquid crystal display apparatus and a number of processes are reduced to save a manufacturing cost.

Embodiment 3

Figure 8:
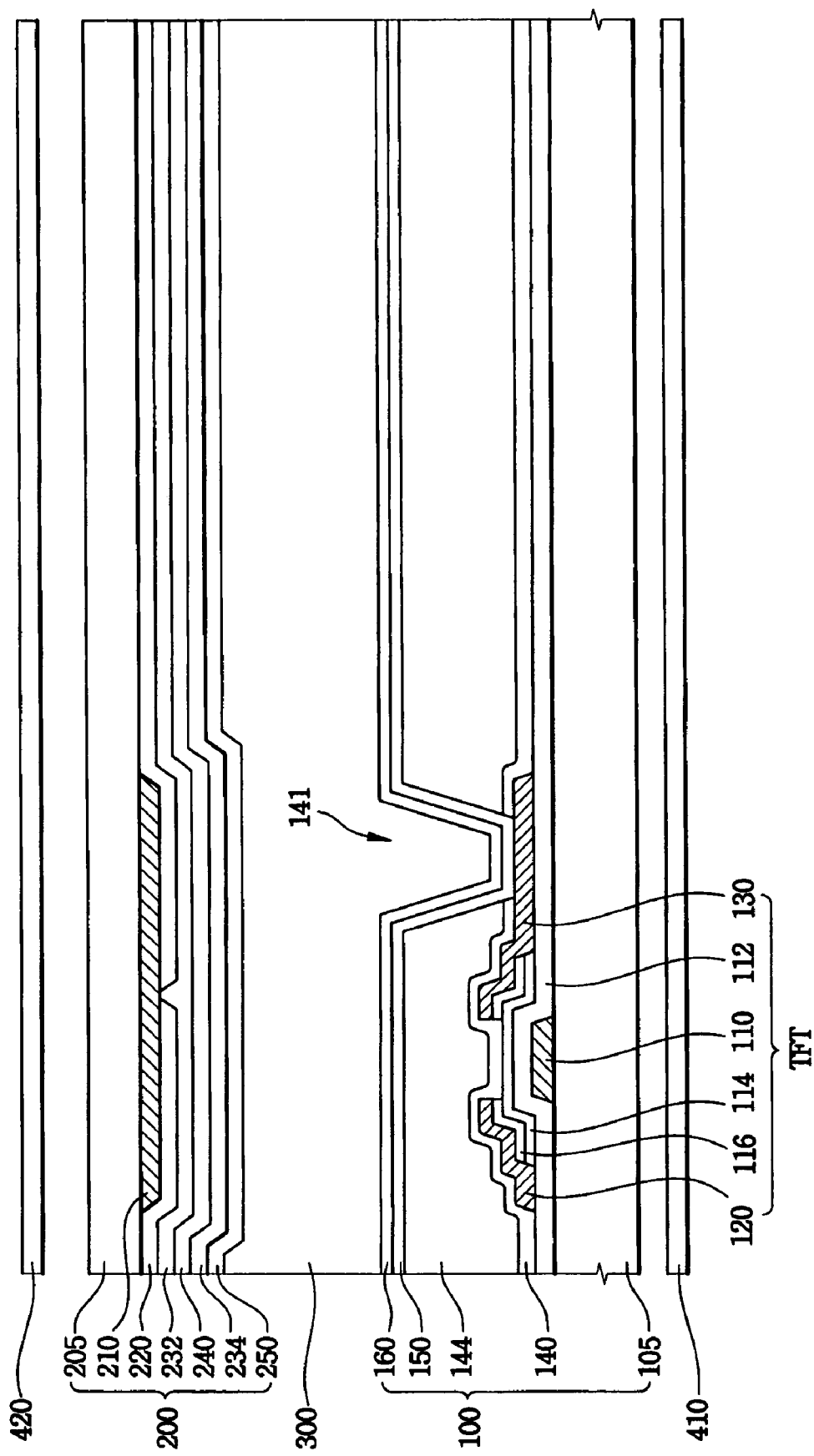
FIG. 8 is a cross-sectional view showing a liquid crystal display apparatus according to a third exemplary embodiment of the present invention.

FIG. 8 is a cross-sectional view showing a liquid crystal display apparatus according to a third exemplary embodiment of the present invention. In the present embodiment, a retardation layer is disposed on an alignment film.

Referring to FIG. 8, a liquid crystal display apparatus according to a third exemplary embodiment includes an array substrate 100, a color filter substrate 200, a liquid crystal layer 300, and first and second polarizing plates 410 and 420. The liquid crystal layer 300 is interposed between the array substrate 100 and the color filter substrate 200. The first polarizing plate 410 is disposed under a backside of the array substrate 100. The second polarizing plate 420 is disposed over a backside of the color filter substrate 200.

The color filter substrate 200 includes a second transparent substrate 205, a black matrix 210, a color filter layer 220, a protection layer 232, a common electrode layer 240, a retardation layer 234 and a second alignment film 250.

The black matrix 210 is formed on the second transparent substrate 205, such that the black matrix 210 faces a switching device TFT. Thus, the black matrix 210 hides the switching device TFT.

The color filter layer 220 includes a red pixel region, a green pixel region and a blue pixel region. The black matrix 210 defines the red pixel region, the green pixel region and the blue pixel region. An edge of the red pixel region, the green pixel region and the blue pixel region may overlap with each other, so that the edge may hide the switching device TFT as a substitute of the black matrix 210.

The protection layer 232 is formed on the black matrix 210 and the color filter layer 220. The protection layer 232 protects the black matrix 210 and the color filter layer 220.

The common electrode layer 240 is formed on the protection layer 232. The common electrode layer 240 receives a reference voltage $V_{com}$. When a pixel voltage is applied to a pixel electrode 150 of an array substrate 100, electric fields are formed between the common electrode layer 240 and a pixel electrode 150 to rearrange liquid crystal molecules of a liquid crystal layer 300.

The retardation layer 234 is formed on the common electrode layer 240. The retardation layer 234 compensates a phase difference of a light that passes through the liquid crystal layer 300. The retardation layer 234 is made of liquid crystal polymer that is hardened when an ultraviolet light is irradiated. For example, the retardation layer 234 comprises cholesteric liquid crystal.

In a process of manufacturing the color filter substrate, a cholesteric liquid crystal material is coated on the common electrode 240. An ultraviolet light is irradiated onto the cholesteric liquid crystal material to fix an arrangement of cholesteric liquid crystal molecules. Thus, the retardation layer 234 that operates as a biaxial film or uni-axial film is formed. When a polarized ultraviolet light is irradiated onto to the cholesteric liquid crystal material, the retardation layer 234 operates as the biaxial film. When a non-polarized ultraviolet light is irradiated onto the cholesteric liquid crystal material, the retardation layer 234 operates as a C-plate film that belongs to the uni-axial film.

The retardation layer 234 may be formed via a spin coating method, a micro gravure coating method or a capillary coating method. Preferably, the retardation layer 234 is formed via the micro gravure coating method or the capillary coating method.

The retardation layer 234 may include reactive mesogen mixture (RMM), polyvinylalchol (PVA), polycarbonate (PC), or cycloolefin polymer (COP).

The second alignment film 250 is formed on the retardation layer 234.

FIGS. 9A through 9E are cross-sectional views showing a process of manufacturing a color filter substrate of FIG. 8.

Figure 9A:
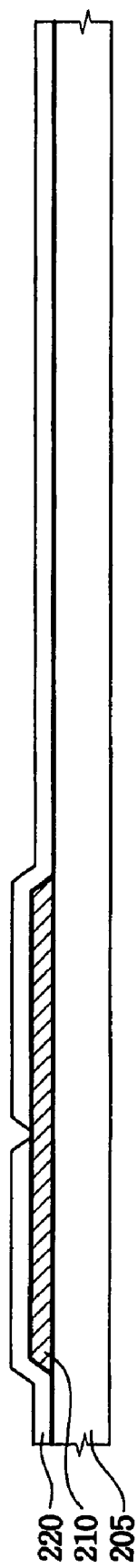

Referring to FIG. 9A, a metal layer including chromium (Cr) is deposited on a second transparent substrate 205. A photoresist is deposited on the metal layer. Then, the photoresist is exposed and developed selectively via a photomask (not shown). Thus, a black matrix 210 including the chromium (Cr) is formed. The black matrix 210 is disposed such that the black matrix 210 faces a switching device of an array substrate when a color filter substrate and an array substrate are assembled together.

Then, a photosensitive red-colored resist is deposited on the second transparent substrate 205. Then, the red-colored resist is exposed and developed, so that red color filter is formed. Green color filter and blue color filter are formed via same process. Thus, color filter layer 220 is formed.

Figure 9B:
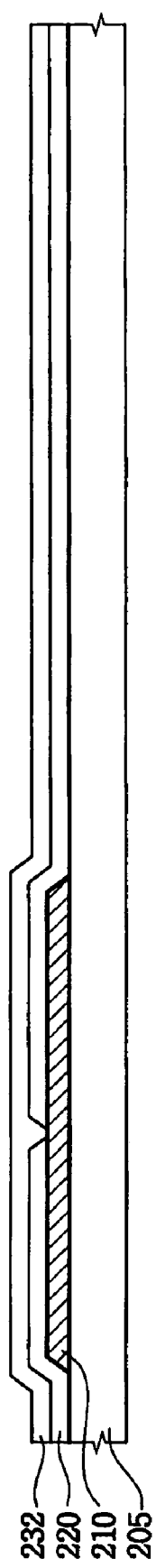

Referring to FIG. 9B, a protection layer 232 is formed on the color filter layer 220 to protect the color filter layer 220.

Figure 9C:
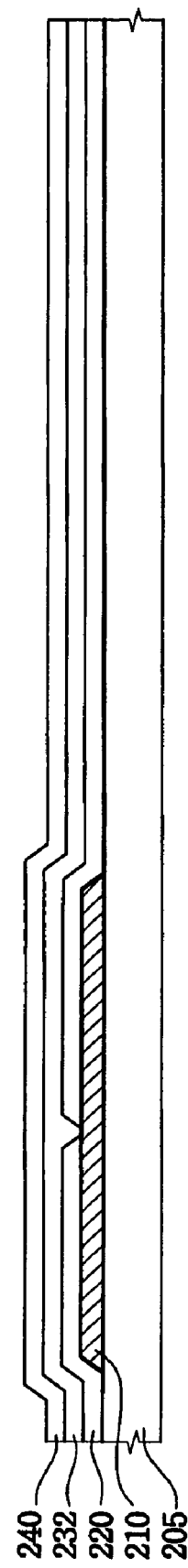

Referring to FIG. 9C, a common electrode layer 240 is formed on the protection layer 232. The common electrode 240 comprises an electrically conductive and transparent material such as indium tin oxide (ITO) or indium zinc oxide (IZO).

Referring to FIG. 9D, a cholesteric liquid crystal material is coated on the common electrode layer 240. An ultraviolet light is irradiated onto the cholesteric liquid crystal material to fix an arrangement of cholesteric liquid crystal molecules. Thus, the retardation layer 234 that operates as a biaxial film or uni-axial film is formed. When a polarized ultraviolet light is irradiated onto to the cholesteric liquid crystal material, the retardation layer 234 operates as the biaxial film. When a non-polarized ultraviolet light is irradiated onto the cholesteric liquid crystal material, the retardation layer 234 operates as a C-plate film that belongs to the uni-axial film.

Figure 9E:
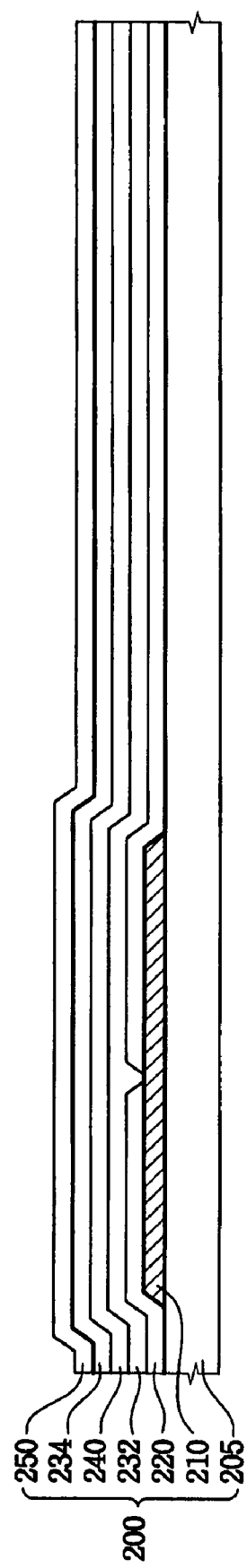

Referring to FIG. 9E, an alignment film 250 is formed on the retardation layer 234 for pre-tilting liquid crystal molecules.

As described above, a retardation layer that is interposed between the common electrode layer and the alignment film takes the place of the retardation film of a general liquid crystal display apparatus, which is disposed over the color filter substrate or under the array substrate, so that the retardation film is not necessary.

Therefore, a number of films for the liquid crystal display apparatus and a number of processes are reduced to save a manufacturing cost.

Embodiment 4

Figure 10:
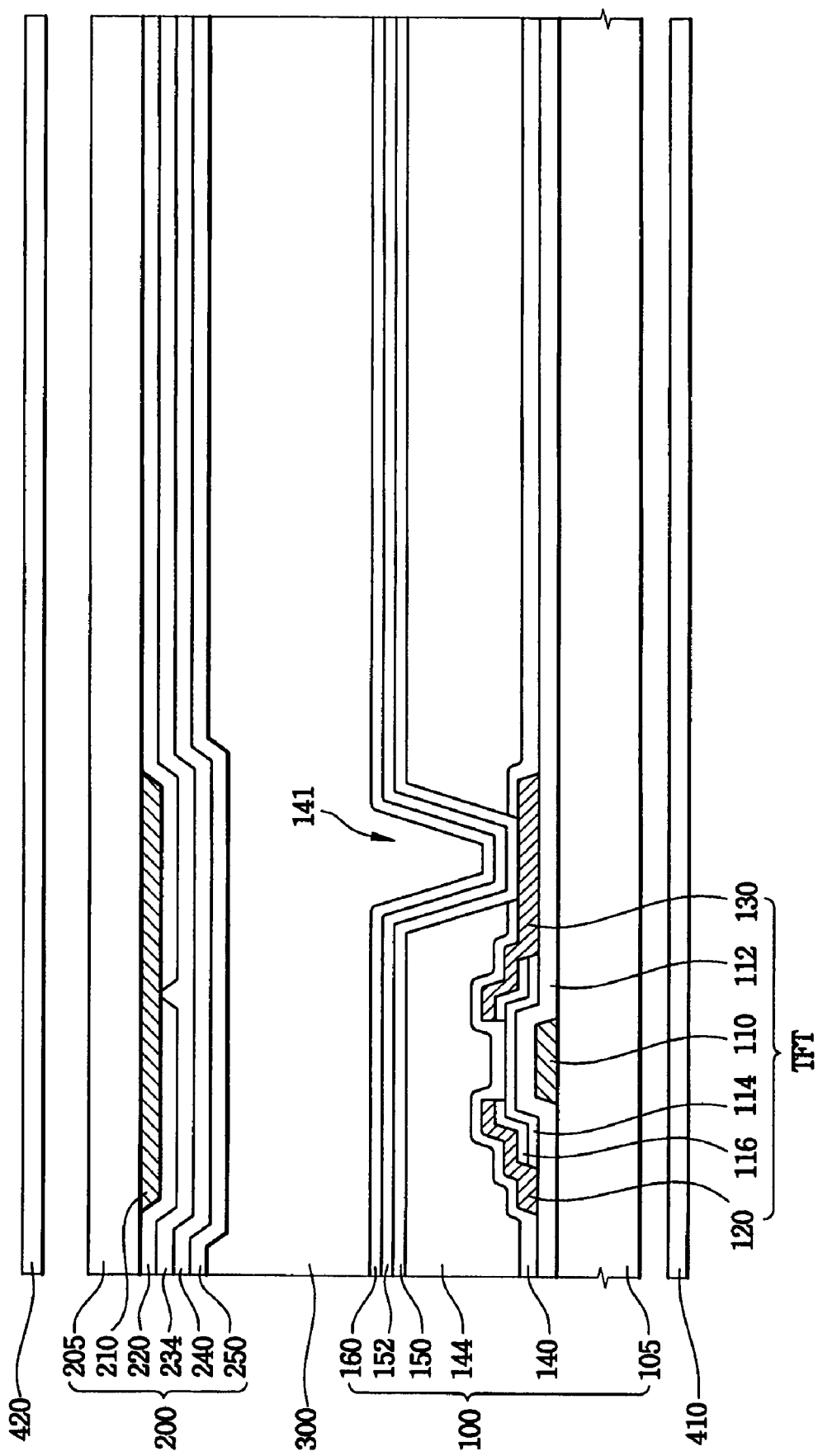
FIG. 10 is cross-sectional view showing a liquid crystal display apparatus according to a fourth exemplary embodiment of the present invention.

FIG. 10 is cross-sectional view showing a liquid crystal display apparatus according to a fourth exemplary embodiment of the present invention. The liquid crystal display apparatus is same as in Embodiment 3 except for position of retardation layer. Thus, the same reference numerals will be used to refer to the same or like parts as those described in Embodiment 3 and any further explanation will be omitted.

Referring to FIG. 10, a liquid crystal display apparatus according to a fourth exemplary embodiment includes an array substrate 100, a color filter substrate 200, a liquid crystal layer 300, and first and second polarizing plates 410 and 420. The liquid crystal layer 300 is interposed between the array substrate 100 and the color filter substrate 200. The first polarizing plate 410 is disposed under a backside of the array substrate 100. The second polarizing plate 420 is disposed over a backside of the color filter substrate 200.

The array substrate 100 includes a first transparent substrate 105, a gate insulation layer 112, a switching device TFT, a passivation layer 140, an organic insulation layer 144, a pixel electrode 150, a retardation layer 152 and a first alignment film 160.

The switching device TFT includes a gate electrode 110, a gate insulation layer 112, a semiconductor layer 114, an ohmic contact layer 116, a source electrode 120 and a drain electrode 130.

The gate insulation layer 112 is formed on the first transparent substrate 105, such that the gate insulation layer 112 covers the gate electrode 110 of the switching device TFT.

The passivation layer 140 covers the switching device TFT such that a portion of the drain electrode 130 of the switching device TFT is exposed.

The organic insulation layer 144 is formed on the passivation layer 140 such that the portion of the drain electrode 130 of the switching device TFT is exposed.

The pixel electrode 150 is formed on the organic insulation layer 144 such that the pixel electrode makes contact with the drain electrode 130 of the switching device TFT via a contact hole 141. The pixel electrode 150 comprises indium tin oxide (ITO) or indium zinc oxide (IZO), so that pixel electrode 150 is transparent and electrically conductive.

The retardation layer 152 is formed on the pixel electrode 150. The retardation layer comprises liquid crystal polymer that is hardened when an ultraviolet light is irradiated. For example, the retardation layer 152 includes cholesteric liquid crystal. The retardation layer 152 compensates a phase difference of a light that passes through the liquid crystal layer 300. The light may be generated from a backlight assembly (not shown) in a transmissive type liquid crystal display apparatus.

In a process of manufacturing the array substrate 100, a cholesteric liquid crystal material is coated on the pixel electrode 150. An ultraviolet light is irradiated onto the cholesteric liquid crystal material to fix an arrangement of cholesteric liquid crystal molecules. Thus, the retardation layer 152 that operates as a biaxial film or uni-axial film is formed. When a polarized ultraviolet light is irradiated onto to the cholesteric liquid crystal material, the retardation layer 152 operates as the biaxial film. When a non-polarized ultraviolet light is irradiated onto the cholesteric liquid crystal material, the retardation layer 152 operates as a C-plate film that belongs to the uni-axial film.

The first alignment film 160 is formed on the retardation layer 160.

FIGS. 11A through 11E are cross-sectional views showing a process of manufacturing an array substrate of FIG. 10.

Figure 11A:
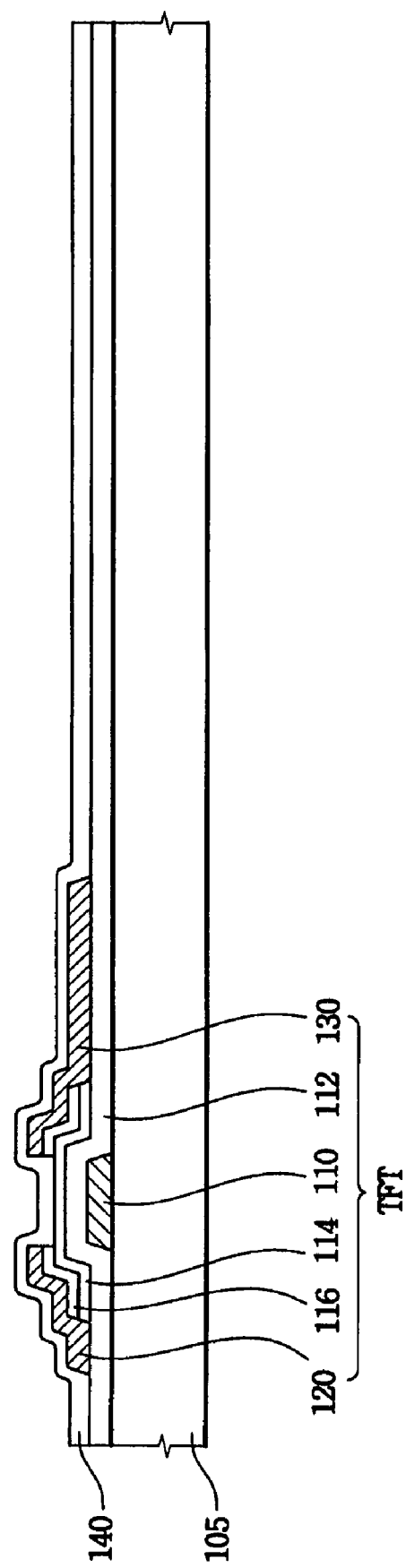
FIGS. 11A through 11E are cross-sectional views showing a process of manufacturing an array substrate of FIG. 10.

Referring to FIG. 11A, a metal such as tantalum (Ta), titanium (Ti), molybdenum (Mo), aluminum (Al), chromium (Cr), cupper (Cu), tungsten (W), etc. is deposited on a first transparent substrate 105 that has a material that is transparent and electrically non-conductive such as glass, ceramic or quartz.

The metal is patterned to form a plurality of gate lines (not shown) and gate electrode 110 protruding from the gate lines.

Not shown in FIG. 11A, when the gate electrode 110 is formed, a storage electrode may be formed together with the gate electrode 110.

Silicon nitride is deposited on the first substrate 105 with a gate electrode formed thereon, so that the gate insulation layer 112 is formed.

Amorphous-silicon and n+ amorphous-silicon are deposited in sequence and patterned to form a semiconducting layer 114 and an ohmic contact layer 116 at a position near the gate electrode 110.

A metal such as tantalum (Ta), titanium (Ti), molybdenum (Mo), aluminum (Al), chromium (Cr), cupper (Cu), tungsten (W), etc. is deposited and patterned to form a source line (not shown), a source electrode 120 and a drain electrode 130. The source electrode 120 protrudes from the source line. The drain electrode 130 is spaced apart from the source electrode 120.

Then, a passivation layer 140 is formed.

Figure 11B:
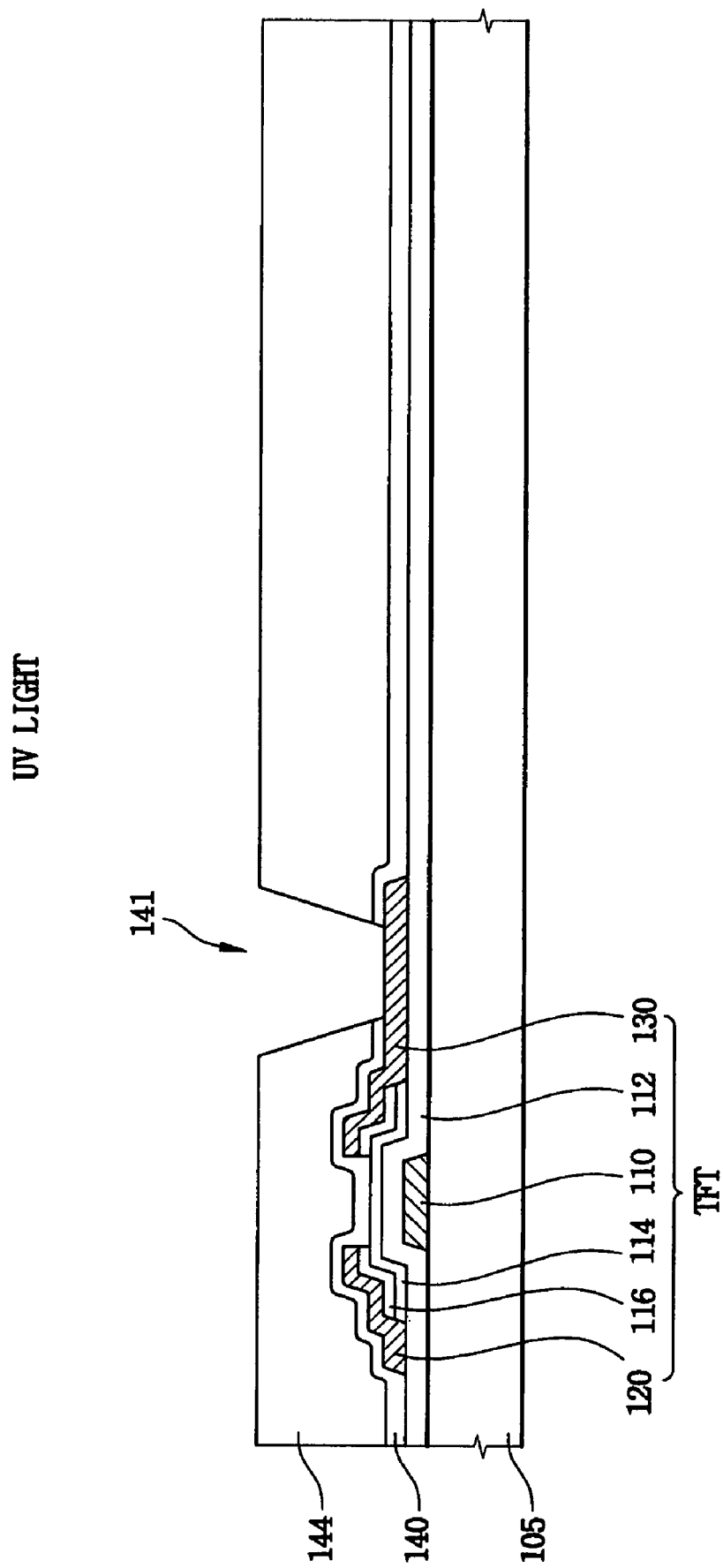

Referring to FIG. 11B, an organic insulation layer 144 is coated on a result of FIG. 11A via a spin coating method. A contact hole 141 is formed such that a drain electrode 130 is exposed via the contact hole 141. The organic insulation layer 144 includes thermosetting plastic such as acrylic resin that is positive type photoresist. Thus, a portion onto which an ultraviolet light is irradiated in a photolithography process is eliminated in a developing process to form the contact hole 144.

Figure 11C:
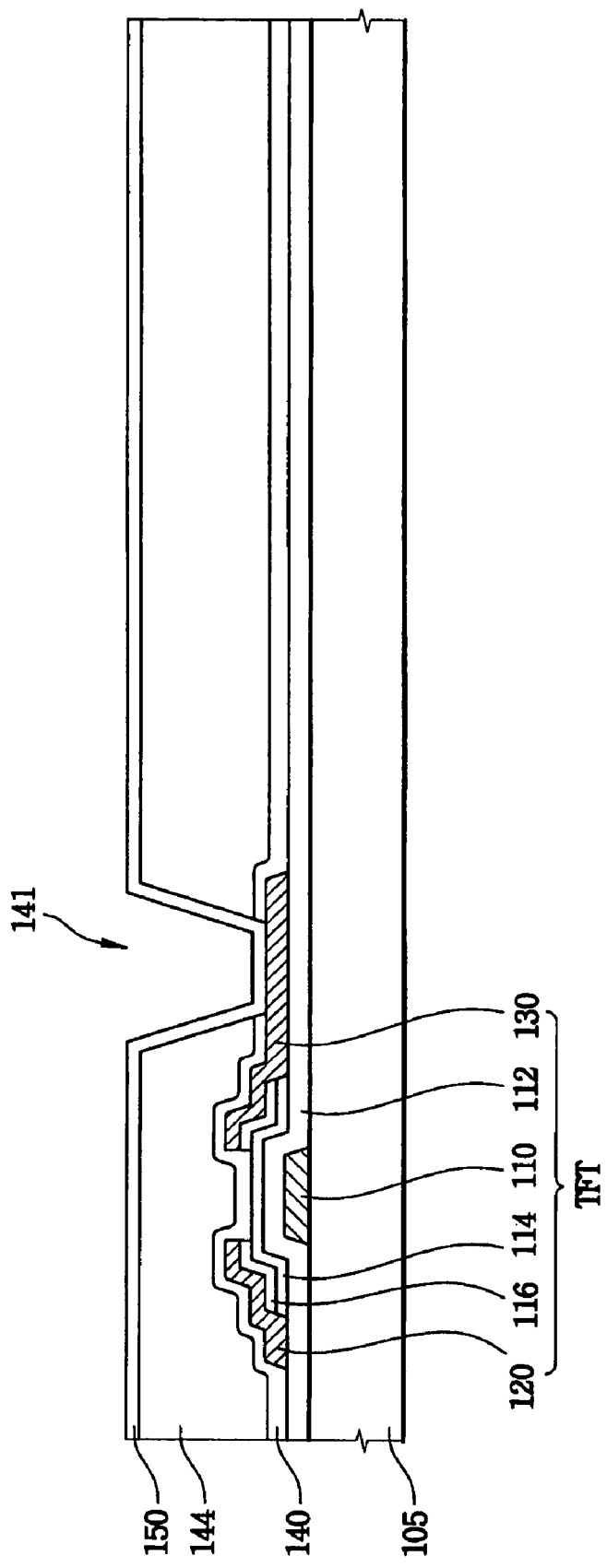

Referring to FIG. 11C, a pixel electrode 150 is formed on an organic insulation layer 144. The pixel electrode 150 makes contact with a drain electrode 130 via a contact hole 141. Thus, the pixel electrode 150 is electrically connected to the drain electrode 130. The pixel electrode 150 has indium tin oxide (ITO) or indium zinc oxide (IZO). The indium tin oxide (ITO) or indium zinc oxide (IZO) may be deposited on an entire surface of the organic insulation layer 144, and patterned to form the pixel electrode 150. The indium tin oxide (ITO) or indium zinc oxide (IZO) may be deposited partially to form the pixel electrode 150.

Figure 11D:
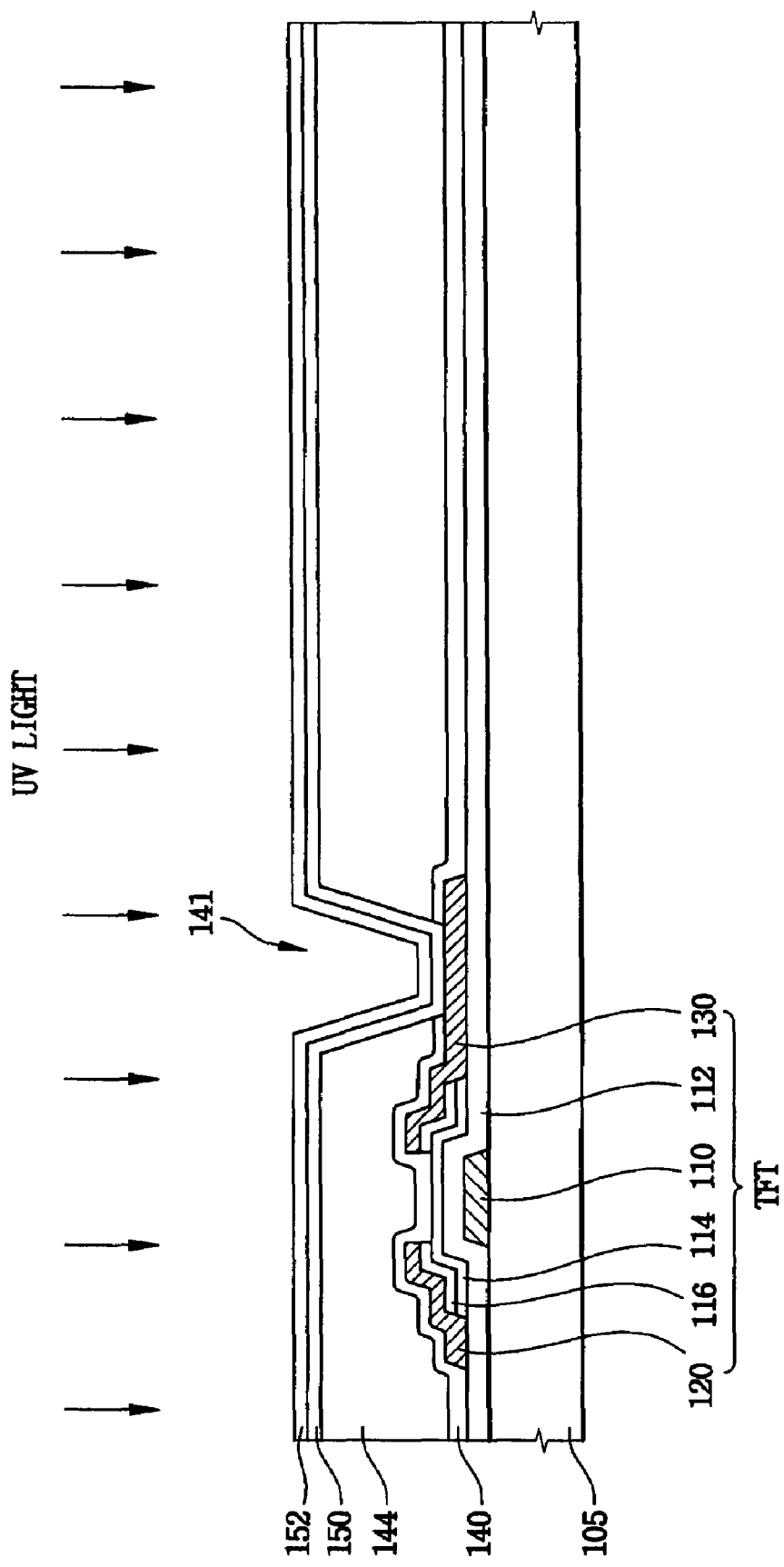

Referring to FIG. 11D, a cholesteric liquid crystal material is coated on the pixel electrode 150. An ultraviolet light is irradiated onto the cholesteric liquid crystal material to fix an arrangement of cholesteric liquid crystal molecules. Thus, the retardation layer 152 that operates as a biaxial film or uni-axial film is formed. When a polarized ultraviolet light is irradiated onto to the cholesteric liquid crystal material, the retardation layer 152 operates as the biaxial film. When a non-polarized ultraviolet light is irradiated onto the cholesteric liquid crystal material, the retardation layer 152 operates as a C-plate film that belongs to the uni-axial film.

The retardation layer 152 may be formed via a spin coating method, a micro gravure coating method or a capillary coating method. Preferably, the retardation layer 234 is formed via the micro gravure coating method or the capillary coating method.

The retardation layer 152 may include reactive mesogen mixture (RMM), polyvinylalchol (PVA), polycarbonate (PC), or cycloolefin polymer (COP).

Figure 11E:
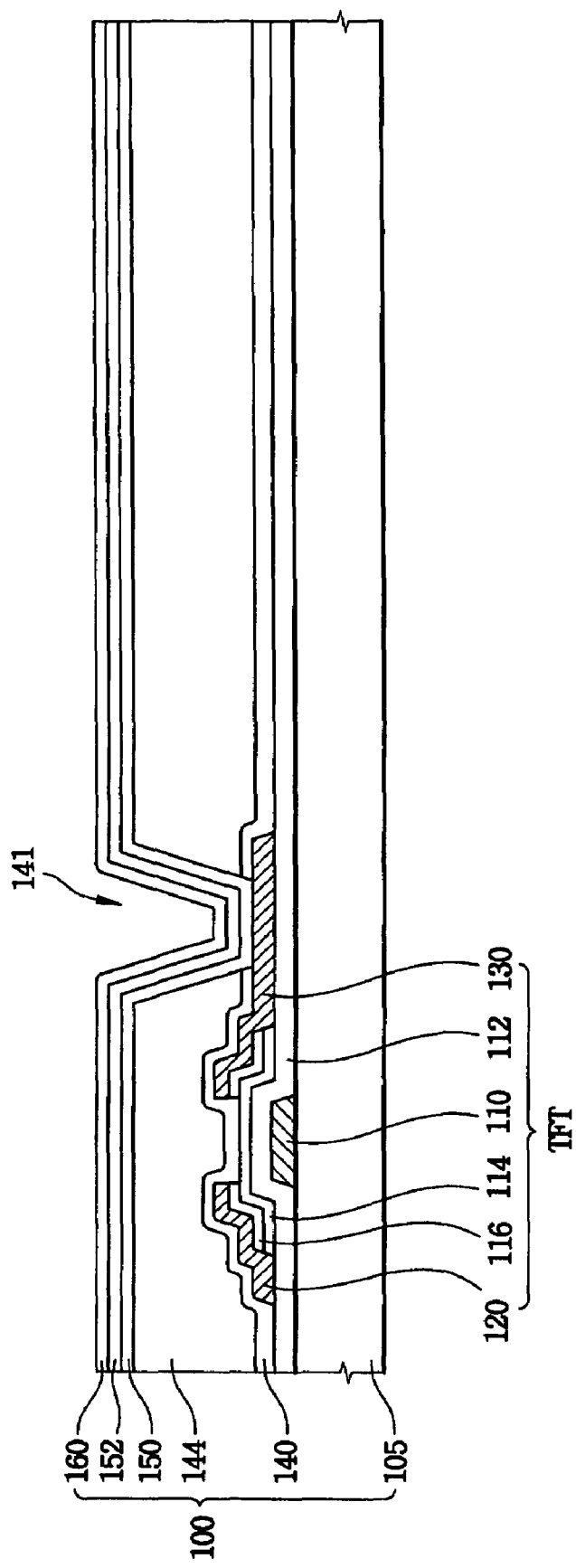

Referring to FIG. 11E, an alignment film 160 for pre-tilting liquid crystal molecules is formed on the retardation film 160.

An array substrate 100 is formed via a process of manufacturing described above. The array substrate 100 is assembled with a color filter substrate 200. The liquid crystal layer 300 is interposed between the array substrate 100 and the color filter substrate 200.

As described above, a retardation layer interposed between the pixel electrode and the alignment film takes the place of the retardation film of a general liquid crystal display apparatus, which is disposed over the color filter substrate or under the array substrate, so that the retardation film is not necessary.

Therefore, a number of films for the liquid crystal display apparatus and a number of processes are reduced to save a manufacturing cost.

Having described the exemplary embodiments of the present invention and its advantages, it is noted that various changes, substitutions and alterations can be made herein without departing from the spirit and scope of the invention as defined by appended claims.

An ultraviolet light is irradiated onto liquid crystal polymer layer to form a retardation layer. The retardation layer is formed in a liquid crystal display panel that includes a color filter substrate, an array substrate and a liquid crystal layer.

The retardation layer may be formed on a color filter layer, protection layer or a common electrode of the color filter substrate. The retardation layer may be formed on a pixel electrode of the array substrate.

The retardation layer interposed between the pixel electrode and the alignment film takes the place of the retardation film of a general liquid crystal display apparatus, which is disposed over the color filter substrate or under the array substrate, so that the retardation film is not necessary.

What is claimed is:

1. A liquid crystal display apparatus comprising:
   a first transparent substrate;
   a second transparent substrate facing the first substrate;
   a liquid crystal layer interposed between the first and second transparent substrates;
   a color filter layer disposed on the second transparent substrate,
   a single retardation layer having a cholesteric liquid crystal material disposed having a substantially uniform thickness on substantially the entire color filter layer, the retardation layer being configured to be coated on the color filter layer and fixed by an ultraviolet light;
   a transparent electrode formed on the retardation layer; and
   an alignment layer formed on the transparent electrode,
   wherein the cholesteric liquid crystal material has a function of a biaxial film.

2. The liquid crystal display apparatus of claim 1, wherein the retardation layer comprises reactive mesogen mixture (RMM), polyvinylalcohol (PVA), polycarbonate (PC) or cycloolefin polymer (COP).

3. The liquid crystal display apparatus of claim 1, wherein the retardation layer is coated via a micro gravure coating method.

4. A liquid crystal display apparatus comprising:
   a first transparent substrate;
   a second transparent substrate facing the first substrate;
   a liquid crystal layer interposed between the first and second transparent substrates;
   a color filter layer disposed on the second transparent substrate;
   a single retardation layer having a cholesteric liquid crystal material disposed having a substantially uniform thickness on substantially the entire color filter layer, the retardation layer being configured to be coated on the color filter layer via micro gravure coating;
   a transparent electrode formed on the retardation layer; and
   an inorganic alignment layer formed on the transparent electrode,
   wherein the cholesteric liquid crystal material has a function of a biaxial film.

5. The liquid crystal display apparatus of claim 4, wherein the inorganic alignment layer comprises at least one selected from the group consisting of silicon oxide (SiO2), a metal oxide such as magnesium oxide (MgO), magnesium fluoride (MgF2) and gold (Au).

6. The liquid crystal display apparatus of claim 4, wherein the retardation layer comprises reactive mesogen mixture (RMM), polyvinylalcohol (PVA), polycarbonate (PC) or cycloolefin polymer (COP).

* * * * *